United States Patent [19]
Hall

[11] Patent Number: 5,262,578
[45] Date of Patent: Nov. 16, 1993

[54] CHEMICAL VESSEL ENVIRONMENTAL CHAMBER

[75] Inventor: James C. Hall, San Jose, Calif.

[73] Assignee: Systems Chemistry, Inc., Milpitas, Calif.

[21] Appl. No.: 979,613

[22] Filed: Nov. 20, 1992

[51] Int. Cl.$^5$ .............................................. B08B 15/00
[52] U.S. Cl. ...................................... 588/249; 141/93;
141/97; 588/258; 588/259; 454/56; 454/65
[58] Field of Search ...................... 588/249, 258, 259;
405/128, 129; 141/93, 97; 220/3; 206/3; 428/2;
55/359, 429, 417, 431, 418; 454/65, 56

[56] References Cited
U.S. PATENT DOCUMENTS

| | | | |
|---|---|---|---|
| 3,267,830 | 8/1966 | Van Gaasbeek | 454/56 X |
| 3,980,008 | 9/1976 | Martin et al. | 141/93 X |
| 4,312,388 | 1/1982 | Hager et al. | 141/93 X |
| 4,566,293 | 1/1986 | Arner et al. | 454/56 X |
| 4,571,250 | 2/1986 | Irmscher et al. | 55/259 |
| 4,802,515 | 2/1989 | Pytryga et al. | 220/3 X |
| 5,121,776 | 6/1992 | Koyach | 141/97 X |

Primary Examiner—Dennis L. Taylor
Attorney, Agent, or Firm—Robert O. Guillot

[57] ABSTRACT

An environmental chamber comprising a transparent dome shaped housing having an annular conduit, including an exhaust port, affixed to the base of the housing. The housing securely fits over an end of a chemical container, to create a controlled environment within the encapsulated space between the housing and the container. Two cylindrical openings at the top of the housing allow chemical transfer hoses to be connected to the chemical container openings. A pair of gloved access ports allow an operator to access the encapsulated space to manipulate connections between the transfer hoses and the chemical container openings. The top of the housing also includes an intake port for delivering clean purging material into the encapsulated space in order to purge the encapsulated environment of any chemical that escaped from the chemical openings during hook up of the transfer tubing. Purging material, such as air, gas or liquid, flows from the intake port through the encapsulated space into the annular conduit, and finally out through the exhaust port. A sensor may be included for warning of a chemical leak within the protected environment. A tensioned lift mechanism attached to the top of the housing aids in lifting, transportation and storage of detached housings.

16 Claims, 2 Drawing Sheets

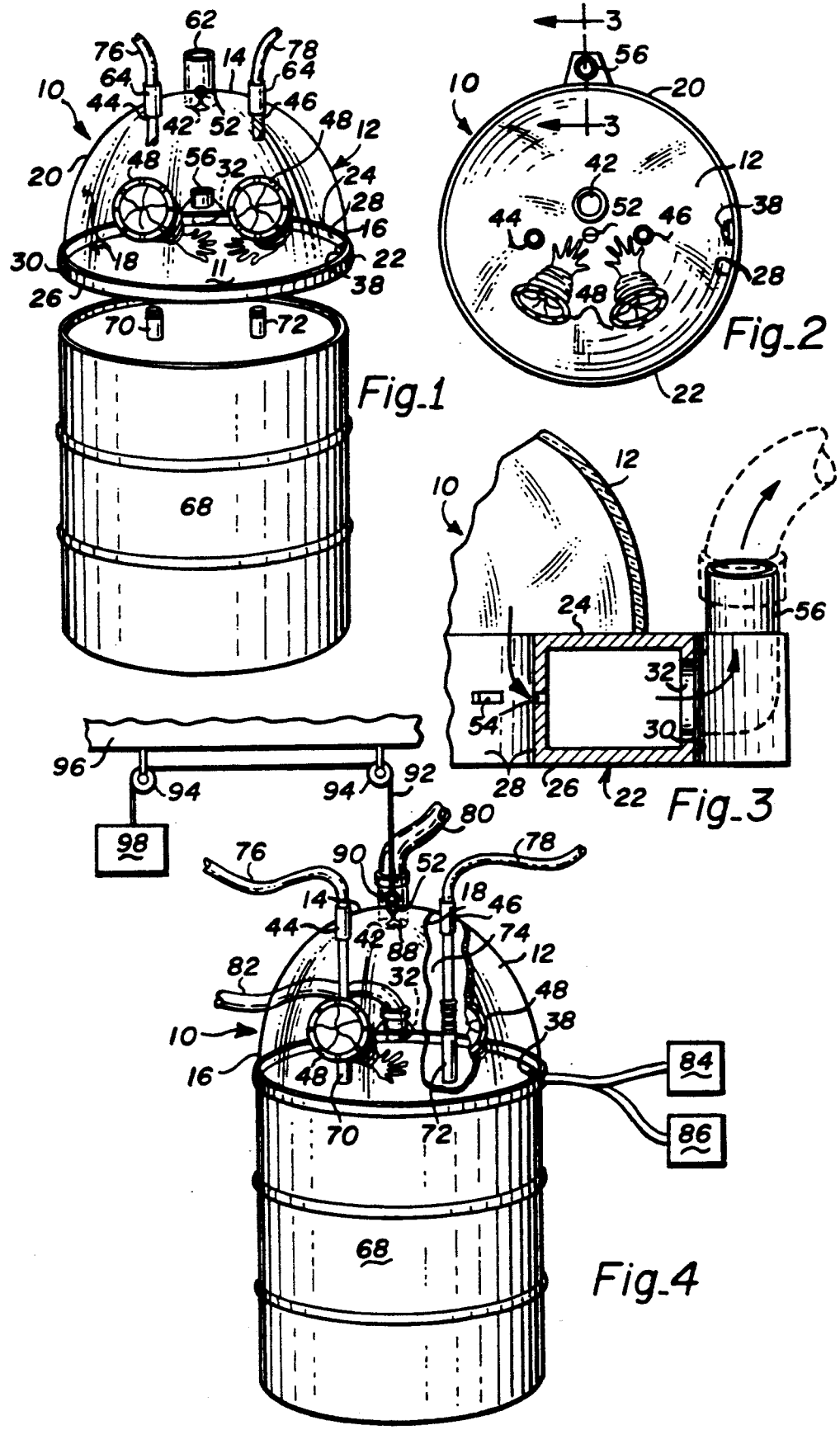

CHEMICAL VESSEL ENVIRONMENTAL CHAMBER

BACKGROUND OF THE INVENTION

1. Field of the Invention

This invention relates generally to devices for hazardous fume containment, and more particularly to a dome shaped housing forming a hood or shield covering the access end of a drum containing toxic chemicals, the housing serving to encapsulate container access orifices and provide for chemical leak detection.

2. Brief Description of the Prior Art

Hazardous chemicals are commonly stored in metal or plastic drum containers. To access the chemicals inside the container, a hose entry port at the top of the container is provided for connection of a hose, through which the chemicals from the container will be extracted and flow to their final destination. An intake port, through which make-up air or gases can flow, is also provided at the top of the container in order to maintain atmospheric pressure within the container as the chemicals are being extracted therefrom.

During non-use or transit, the output and intake ports of a drum containing chemicals will be capped to prohibit escape, spillage or leakage of the contents therein. In order to connect a transfer hose to either the output port or the intake port, the ports must be uncapped. In the moments between uncapping a port and connecting a hose to that port, some amount of gas or vapor from within the container will escape into the atmosphere outside the container.

The persons performing the hook up will be exposed to the escaped gas or vapor. Further, the chemicals that have escaped into the atmosphere may endanger other equipment or personnel in the room where the container is located, and can migrate to other rooms within the facility where personnel or equipment may not be adequately protected. Eventually the vapors will enter the atmospheric environment. In addition, contamination of the contents of the container may occur as contaminates can enter the open port after it is uncapped.

Although most personnel who perform the connection of transfer hoses to toxic chemical containers wear protective clothing and breathing apparatus, the outside of their protective clothing is still exposed to the toxic chemicals, thus exposing the worker to the chemicals as he or she changes out of the protective gear.

SUMMARY OF THE INVENTION

It is therefore a primary objective of the present invention to provide means forming an encapsulated chamber for the top of a hazardous chemical container, that traps gases or vapors which escape during the uncapping of the container.

Another objective of the present invention is to provide a housing forming an environmental chamber that securely fits atop a standard chemical transport drum, encapsulating the container access orifices.

A further objective of the present invention is to provide a housing forming an encapsulated chamber for the top of a hazardous chemical container, that includes a purging system for cleaning the air trapped within the chamber prior to detaching the housing from the container.

Still another objective of the present invention is to provide means forming an encapsulated chamber for the top of a hazardous chemical container that allows for connecting and disconnecting transfer hoses to the container orifices while preventing any escaped vapors or gases from entering the atmosphere.

Briefly, a preferred embodiment of the present invention comprises means forming an environmental chamber including a transparent, dome shaped housing having an annular conduit affixed to the base of the dome shaped housing. The housing is adapted to securely fit over the access end of a chemical container to create a controlled environment within the space enclosed by the housing and container end. Chemical transfer hoses pass through two cylindrical openings in the housing to access the container openings. A pair of gloved access ports are also provided in the housing to allow an operator to manipulate connectors joining the transfer hoses with the container openings within the protected environment. The housing also includes an air intake port for allowing the encapsulated environment to be purged of any chemical vapors emitted from the openings. Purging material, such as air, gas or liquid, flows from the air intake port through the domed area into the annular conduit via a plurality of apertures formed therein, and finally out through an exhaust port formed on the outer surface of the annular conduit. A lift eye may be attached to the top of the housing to aid in lifting, transportation and storage of the housing.

An important advantage of the present invention is that it provides means for trapping hazardous fluids or gases that might otherwise escape during the connection and disconnection of transfer hoses to a chemical container.

Another advantage of the present invention is that it provides a housing that securely fits atop a standard chemical containing drum, encapsulating the container access orifices, and forming an environmental chamber.

A further advantage of the present invention is that it provides a housing for encapsulating the access end of a hazardous chemical container and includes a purging system for cleaning the air trapped within the encapsulated space prior to detaching the housing from the container.

Still another advantage of the present invention is that it provides an environmentally secure chamber at the access end of a hazardous chemical container within which transfer hoses can be connected to and disconnected from the orifices of the container while preventing any escaped vapors or gases from entering the atmosphere.

These and other objects and advantages of the present invention will no doubt become apparent to those skilled in the art after having read the following detailed description of the preferred embodiment which is illustrated by the various drawing figures.

BRIEF DESCRIPTION OF THE DRAWINGS

FIG. 1 is an isometric view of a housing and associated components forming an environmental chamber in accordance with the present invention.

FIG. 2 is a top plan view of the housing shown in FIG. 1.

FIG. 3 is a cross-sectional view, taken along the line 3—3 of FIG. 2, showing details of the annular conduit.

FIG. 4 is an isometric view showing a partially broken environmental chamber apparatus in accordance with the present invention in engagement with a chemical container, showing the connection of the transfer hoses and exhaust hoses.

DETAILED DESCRIPTION OF THE BEST MODE

Figure 5:
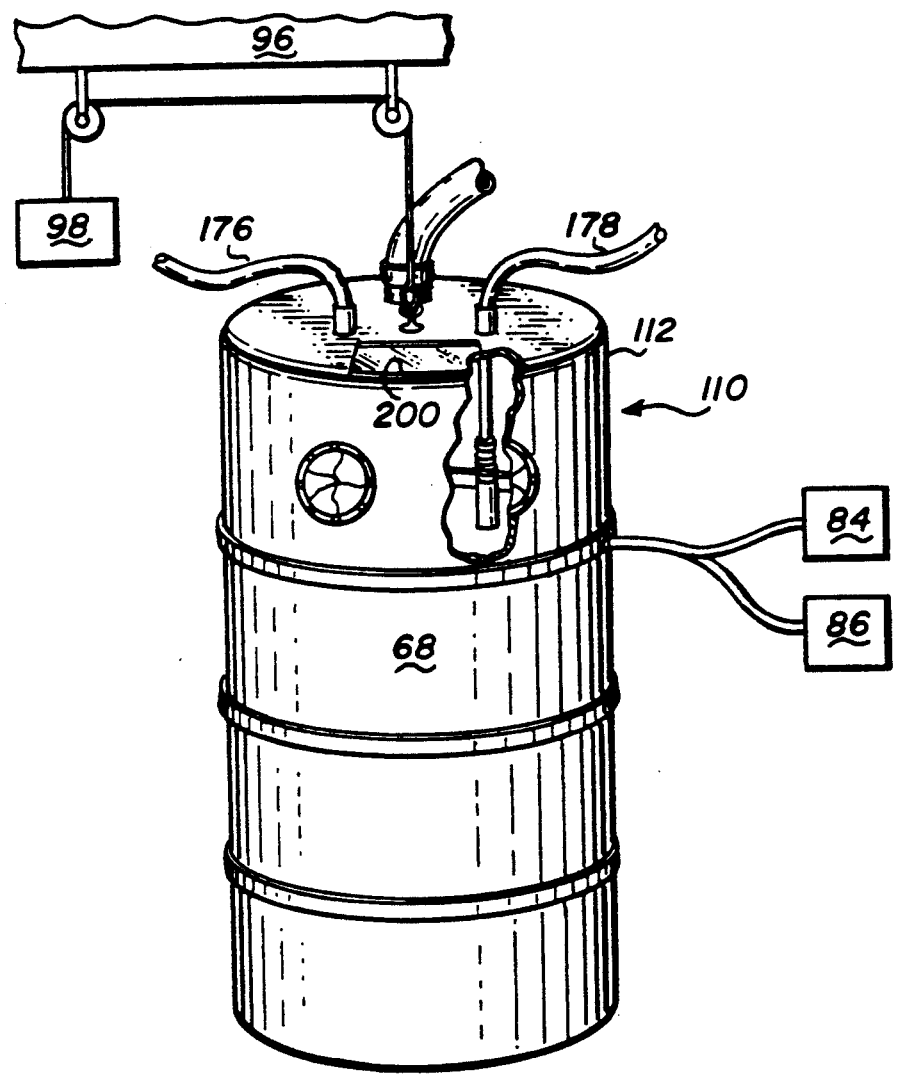
FIG. 5 is an isometric view showing an alternative embodiment of the present invention, wherein a cylindrically shaped housing is made of stainless steel and includes a reinforced wire safety glass viewing window.

FIG. 1 illustrates an apparatus 10 forming an environmental chamber 11 in accordance with the present invention and a standard chemical container 68 illustrating how the chamber apparatus 10 is placed atop the container. The apparatus 10 includes means for encapsulating a portion of a chemical container comprising a transparent, dome shaped housing 12 which is illustrated as one-half of a spherical shell of clear polyvinyl chloride. The housing 12 has a top 14, a base 16, an inner surface 18 and an outer surface 20. It provides 360 degree viewing of the environment underneath the housing 12 to assist the operator in connecting or disconnecting the transfer hoses 76 and 78 with the container orifices 70 and 72.

An annular air exhaust conduit 22 is engaged to the base 16 of the housing 12. The annular conduit 22 is a hollow ring having a rectangular cross-section that includes a top wall 24, a bottom wall 26, an inner wall 28 and an outer wall 30, and is attached at its top wall 24 to the base 16. A plurality of elongated apertures 54 are formed through the inner wall 28 of the annular conduit 22, and an exhaust port 32 is formed at a point on the outer wall 30 thereof. In the preferred embodiment, an exit port elbow extension 56 extends outwardly from the exhaust port 32 to provide a means for connecting an exhaust hose (further described below) thereto.

A chemical sensor 38 is also disposed along the inner wall 28 of the annular conduit 22. The sensor 38 can be one of many existing gas or liquid sensors (for example, fiber optic or capacitance types) which detect the existence of chemicals within the environmental chamber 10; in the preferred embodiment, the sensor used is that disclosed in U.S. Pat. No. 5,090,871. When chemicals are detected, the sensor 38 can be caused to activate an alarm and/or activate a safety shutdown system which closes off the supply of chemicals from the source, thereby preventing further escape of the hazardous chemicals or entry of the chemicals into the environment.

An air intake port 42 is formed through the top 14 of the transparent housing 12 proximate the center thereof. A hollow, cylindrical fitting arm 62 is formed from the housing material at the air intake port 42, to provide a means for attaching an air source. It will be obvious to one of ordinary skill in the art that the combination of the air intake port, the annular conduit and the exhaust port provide a means for purging the air in the environment underneath the housing 12.

As a means for inserting chemical transfer hoses into the space underneath the housing 12, two hose entry ports 44 and 46 are provided at the top 14 of the transparent housing 12. Each hose entry port 44 and 46 includes a guide arm 64 that is a hollow, cylindrically shaped section formed from the housing material. The guides 64 provide a pilot for feeding chemical transfer hoses 76 and 78 into the space underneath the transparent housing 12.

A pair of gloved openings 48, formed in the housing 12, allow an operator to access the protected area underneath the housing 12 and provide a means for manipulating the connections between the transfer hoses and the chemical container's access orifices without risk of exposure to any chemicals escaping from the container.

A lift eye 52, disposed at the top of the housing 12, is available for connecting to a tension driven lift mechanism 66 (shown in FIG. 4) to the housing, which allows weighty environmental chamber housings to be lifted and moved with ease.

FIG. 2 is a top view of the environmental chamber apparatus 10 of FIG. 1, further illustrating the placement of the air intake port 42, hose entry ports 44 and 46, and lift eye 52 at the top of the housing 12, as well as the location of the gloved openings 48 about the housing 12. The two hose entry ports 44 and 46 are located at the top of the housing on opposite sides of the air intake port 42, offset therefrom. The exhaust port elbow extension 56 is disposed on the outer surface 20 of the housing 12. The placement of chemical sensor 38 shown in this figure is for example only, and it is anticipated that the sensor can be attached to the inner surface 28 of the annular conduit 22 at any other location as well.

FIG. 3 is a cross-sectional view of a portion of an environmental chamber housing 12, illustrating the details of the annular conduit 22. The conduit has a top wall 24, bottom wall 26, inner wall 28 and an outer wall 30. Elongated apertures 54 are disposed through the inner wall 28 and provide openings for air and gases within the environmental chamber to enter the annular conduit 22 from within the chamber 10.

The air and gasses exit the conduit 22 through the exhaust port 32. An elbow extension 56 aids in connecting a transfer hose, shown in dashed lines, which directs the exhaust air to a treatment center (not shown).

FIG. 4 is an isometric view of a partially broken environmental chamber 10 in accordance with the present invention, shown in engagement with a chemical container in an operative mode. A standard chemical container 68 includes two container access orifices 70 and 72—one (70) through which the contained chemicals are extracted and the other (72) through which make-up air or recycled chemicals are input in order to maintain the pressure within the container 68. As illustrated, the environmental chamber apparatus 10 is positioned atop the chemical container 68 so that the container access orifices 70 and 72 are aligned along the same axes as the hose entry ports 44 and 46 at the top of the transparent housing 12. Although the environmental chamber apparatus 10 will operate efficiently in other positions (such as where the orifices and hose entry ports are not aligned), in the preferred embodiment, the orifices and hose entry ports are aligned for ease of connecting the transfer hoses which will be passed through the hose entry ports and connected to the orifices.

An encapsulation zone 74 is created by the space between the inner surface 18 of the dome shaped housing 12 (from the top 14 of the housing to the base 16 of the housing) and the portion of the chemical container 68 underneath the housing 12. The transparent housing 12 is partially cut away to illustrate how a transfer hose 78 is guided through the hose entry port 46, in preparation for the coupling of the transfer hose 78 to the container access orifice 72. By slipping his or her hands through the gloved openings 48, an operator can manually connect the transfer hose 78 to the container access orifice 72 within the confines of the encapsulation zone 74. In like manner, an input transfer hose 76 is passed through hose entry port 44 for connection to the orifice 70. Assuming that the chemicals within the container 68 are being extracted out of the container orifice 72 and through the transfer hose 78, then make-up air, gas or chemicals are being input back into the container 68 through the input transfer hose 76 that is connected to the input container access orifice 70, where the input transfer hose 76 is guided by the hose entry port 44.

It should be noted that the hose entry ports 44 and 46 may include seals that surround the transfer hoses 76 and 78 to prevent any contaminated air within the encapsulation zone 74 from escaping into the atmosphere. In addition, the chamber apparatus 10 may include a gasket disposed between the bottom surface 26 of the annular conduit 22 and the chemical container 68 to further prevent the transfer of contaminated air from within the encapsulation zone to the atmosphere.

Also shown is the air input hose 80 connected to the air intake port 42 and the exhaust hose 82 connected to the exhaust port 32. Purging air enters the chamber 10 through the air intake port 42 from the input hose 80. Simultaneously, the air within the encapsulation zone 74 is drawn into the exhaust port 32 and through the exhaust hose 82, to be treated as required. This system exchanges the air within the environmental chamber 10, purging any hazardous fumes or vapors that have leaked or escaped from the container access orifices 70 and 72.

The purging system can be run constantly, or only when a leak has occurred. To determine when a leak has occurred, an optional leak detector or chemical sensor 38, disposed within the encapsulation zone 74 as discussed above, can be connected to an alarm 84 and/or to a safety shutdown system 86. When the sensor 38 detects a leak within the encapsulation zone 74, it sends a signal to an alarm 84 which emits an audible sound, warning personnel in the facility where the container 68 is located that a leak has occurred. Optionally, another signal, either from the sensor 38 or from the alarm 84, can be connected to a safety shutdown system 86 that will stop the flow of chemicals out of the container 68 until the leak is fixed and the system is reset.

A tension driven lift mechanism comprises a lift plate 88, attached to the inner surface 18 of the top 14 of the domed housing 12, and a lift eye 52 that is affixed to the plate 88 and extends through the domed housing 12. The mechanism provides a system for easily lifting and storing the chamber apparatus 10. A hook 90, disposed at one end of a cable 92, is linked to the lift eye 52. The cable 92 is threaded through two separate pulleys 94, which are each securely fastened to a ceiling or overhead beam 96. The other end of the cable 92 is attached to a counterweight 98. The weight of the counterweight 98 is sufficient to easily lift and balance the environmental chamber apparatus 10 so that the apparatus will hang at a desired height.

FIG. 5 is an isometric view of an alternative embodiment of the environmental chamber apparatus 110 of the present invention, where the housing 112 is made of stainless steel and includes a reinforced wire safety glass viewing window 200. Although most acids, bases or oxidizers are compatible with the PVC housing 12 hereinabove described, other chemicals, such as flammable chemicals, may require a stainless steel enclosure 112. The reinforced wire safety glass window 200 allows an operator to see inside the protected area in order to connect or disconnect the transfer hoses 176 and 178.

Although the present invention has been described above in terms of a specific embodiment, it is anticipated that alterations and modifications thereof will no doubt become apparent to those skilled in the art. It is therefore intended that the following claims be interpreted as covering all such alterations modifications as fall within the true spirit and scope of the invention.

What is claimed is:

1. An environmental safety system for encapsulating the access end of a chemical container to prevent chemical leaks, comprising:
   housing means for cooperating with the access end of a container to form a substantially air tight chamber;
   means forming ports in said housing means through which chemical transfer hoses may be extended into said chamber for connection to drum access orifices;
   means extending through said housing means to provide access to said chamber; and
   means for allowing the flow of purging fluids through said chamber.

2. An environmental safety system as recited in claim 1 wherein said housing means includes a transparent dome shaped housing of sufficient size to cover said drum access orifices.

3. An environmental safety system as recited in claim 1 wherein said housing means includes a stainless steel housing of sufficient size to cover the orifices of a chemical container, and a reinforced glass window disposed in said housing means for viewing the area underneath the housing.

4. An environmental safety system as recited in claim 1 wherein said means extending through said housing means comprises a pair of gloved openings in said housing means.

5. An environmental safety system as recited in claim 1 wherein said means forming ports comprises a pair of orifices disposed in said housing means, whereby said orifices provide an opening for inserting transfer hoses therewithin.

6. An environmental safety system as recited in claim 5 wherein said means forming ports further comprises a cylindrical guide formed at each of said orifices, wherein said guides provide a conduit for inserting said transfer hoses.

7. An environmental safety system as recited in claim 1 wherein said means for allowing the flow of purging fluids comprises:
   an air intake port disposed in said housing means;
   an annular conduit having an inner surface and an outer surface, said inner surface including apertures formed therethrough; and
   an exhaust port disposed through said outer surface of said annular conduit;
   whereby fresh air is delivered to within said chamber through said air intake port, said fresh air entering said annular conduit through said apertures and exiting out said chamber through said exhaust port.

8. An environmental safety system as recited in claim 7 wherein said annular conduit is attached to said housing means.

9. An environmental safety system as recited in claim 1 further including a tensioned lift assembly comprising:
   an eye disposed atop said housing means;
   a cable having a first end and a second end, said first end including a hook for connection with said eye, and said second end being fastened to a counterweight; and at least one pulley, said cable being in operative engagement with said pulley;

where said pulley is mounted to a ceiling and said counterweight aids in lifting and balancing said housing means.

10. An environmental chamber for encapsulating the access apertures of a chemical container, comprising:

a generally dome shaped housing having an inner surface, an outer surface, a top and a base;

an annular conduit having an inner wall and an outer wall, said conduit being attached to said base of said housing, said conduit further including at least one aperture formed in said inner wall thereof;

an exhaust port formed through said outer wall of said annular conduit;

a first hose entry port and a second hose entry port, each said hose entry port being formed through said housing;

an intake port formed through said housing; and a pair of gloved openings formed through said housing.

11. An environmental chamber as recited in claim 10 wherein said annular conduit includes a plurality of apertures disposed through said inner wall of said annular conduit.

12. An environmental chamber as recited in claim 10 further comprising a sensor disposed along said inner wall of said annular conduit, said sensor being provided for sensing the presence of a gas, vapor or liquid within said environmental chamber.

13. An environmental chamber as recited in claim 10 further comprising an attachment elbow formed at said exhaust port.

14. An environmental chamber as recited in claim 10 further comprising a cylindrical guide formed at both said first hose entry port and said second hose entry port.

15. An environmental chamber as recited in claim 10 further including a cylindrical fitting arm formed at said intake port.

16. An environmental chamber as recited in claim 10 further comprising a lift hook disposed at said top of said housing.

* * * * *